United States Patent [19]

Chen et al.

[11] Patent Number: 4,731,185

[45] Date of Patent: Mar. 15, 1988

[54] BIOLOGICAL WASTEWATER TREATING SYSTEM

[75] Inventors: Michael S. K. Chen, Zionsville; Marshall L. Spector, Allentown, both of Pa.

[73] Assignee: Air Products and Chemicals, Inc., Allentown, Pa.

[21] Appl. No.: 513,194

[22] Filed: Jul. 12, 1983

Related U.S. Application Data

[63] Continuation-in-part of Ser. No. 282,674, Jul. 13, 1981, abandoned.

[51] Int. Cl.[4] .............................................. C02F 3/30
[52] U.S. Cl. .................................. 210/605; 210/614; 210/903; 210/906
[58] Field of Search ............... 210/605, 623, 624, 614, 210/626–629, 903, 906

[56] References Cited

U.S. PATENT DOCUMENTS

| | | | |
|---|---|---|---|
| 3,864,246 | 2/1975 | Casey | 210/7 |
| 4,056,465 | 11/1977 | Spector | 210/7 |
| 4,162,153 | 7/1979 | Spector | 71/12 |
| 4,271,026 | 6/1981 | Chen | 210/605 |

OTHER PUBLICATIONS

"Process Design Manual for Upgrading Existing Wastewater Treatment Plants"—U.S. Environmental Protection Agency Technology Transfer.

*Primary Examiner*—Benoit Castel
*Attorney, Agent, or Firm*—Mark L. Rodgers; William F. Marsh; James C. Simmons

[57] ABSTRACT

A modified activated sludge system is provided wherein wastewater containing $BOD_5$ and phosphate values is admixed in an initial zone with biomass-containing recycled sludge to form a mixed liquor under conditions effecting sorption of $BOD_5$ in the biomass. Subsequently, said mixed liquor is subjected to aeration in an oxidation zone under conditions for effecting oxidation of $BOD_5$, such that oxidizing agent is incorporated into the oxidation zone at a rate not substantially exceeding the rate of oxidation. By such operation, considerable savings in power requirements for oxygen transfer to the mixed liquid are had, while developing and maintaining a dense non-bulking biomass having the properties of good removal of phosphate from the wastewater influent.

9 Claims, 1 Drawing Figure

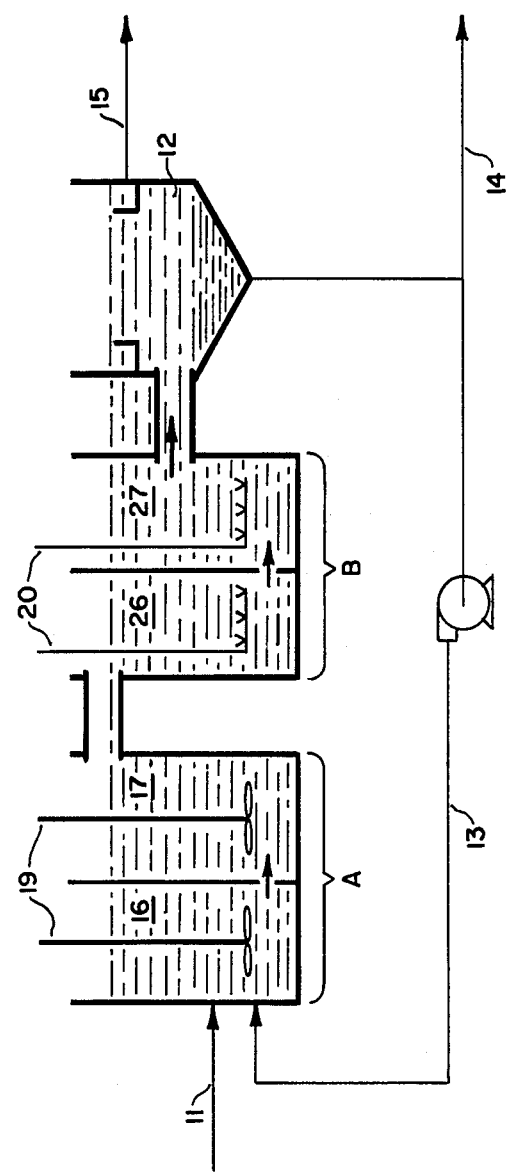

BIOLOGICAL WASTEWATER TREATING SYSTEM

CROSS-REFERENCE TO PARENT APPLICATION

This is a continuation-in-part of abandoned Ser. No. 282,674 filed 13 July 1981, the subject matter of which is hereby incorporated by reference.

TECHNICAL FIELD

This invention relates generally to improvements in the treatment of municipal sewage and/or industrial wastewater by an activated sludge process.

BACKGROUND OF THE PRIOR ART

The prior art pertinent to the instant invention is discussed at length in U.S. Pat. No. 4,056,465 issued to one of the present inventors. The present invention is directed to improvements over the system disclosed in said patent.

The selective production of biomass species capable of removing phosphate values and producing a non-bulking sludge of rapid settling characteristics is attained in accordance with the above cited patent by strictly maintaining specific conditions in an initial operating zone where incoming wastewater and recycled sludge from secondary clarification are mixed to form a mixed liquor. Under these conditions the proliferation of undesired high surface area microorganisms is avoided, while substantial quantities of Biological Oxygen Demand (BOD) are sorbed from the influent wastewater by organisms having the capability of doing so under these conditions.

The conditions employed in this initial zone are termed "anaerobic" in the above mentioned patent. More specifically, it is required that the amount of oxygen and/or oxidizing agents introduced into this zone be minimized so that the biomass is forced or stressed by the conditions to hydrolyze polyphosphates contained within the walls of the cells in order to provide the energy necessary to sorb BOD. If any significant amount of oxygen or oxidizing agents is present in this zone, the oxygen (rather than the contained polyphosphate) will be the source of energy for the sorption of BOD to the detriment of the desired mechanism of this invention. Accordingly, efforts must be made to minimize, if not totally exclude, the presence of oxygen in this zone. Positive steps which can be taken include covering the zone to prevent contact with atmospheric oxygen, blanketing the zone with nitrogen, bubbling nitrogen through the mixed liquor to strip any oxygen that might have been entrained, etc. Obviously, no positive action is permitted which might introduce oxygen, such as, aeration by use of a surface aerator or introducing an oxygen containing gas, e.g. air, via a sparger or diffuser. No oxygen is to be deliberately introduced into this zone and this zone is to be maintained substantially free of oxygen and oxidizing agents. In any commercial plant it is almost impossible to ensure complete absence of all oxygen or oxidizing agents and the presence of a minor, insignificant amount of oxygen, while never desirable, can be tolerated without destroying the operability of this process. Accordingly, when no deliberate introduction of oxygen is being practiced, e.g. aeration, isolated points of detectable dissolved oxygen (DO) of up to 0.7 ppm, but preferably less than 0.3 ppm, can be acceptable, at least for short periods of time. Any extensive or high presence of oxygen or any significant level of continuous oxygen introduction is, of course, unacceptable and contrary to the requirements of this process.

Subsequently, the mixed liquor treated in the initial sorption zone is then treated in an oxidation zone where the food initially sorbed in the sorption zone is oxidized and any remaining BOD is sorbed and oxidized. During this oxidation stage the energy previously lost by hydrolysis of polyphosphates is recouped and polyphosphates are reformed and stored within the aerated biomass, thus removing phosphate from the mixed liquor.

If denitrification of the wastewater is also desired, the patent indicates that an anoxic zone may be interposed between the anaerobic and the oxidation zone.

The term "anoxic" is defined in the aforesaid patent "as the condition existing within a sewage treating zone wherein BOD is metabolized by nitrates and/or nitrites in initial total concentrations higher than about 0.5 ppm expressed as nitrogen, and dissolved oxygen is less than 0.7 ppm, preferably at less than 0.4 ppm".

As further described in the patent, in order to assure adequate oxygen presence in the oxidation zone to effect desired metabolism of BOD and the desired phosphate uptake, the dissolved oxygen content (DO) of that zone should be maintained above 1 ppm and preferably above 2 ppm. In the several operating examples of the patent the average DO employed in the total oxidation zone is close to or above 6 ppm.

U.S. Pat. No. 4,162,153 which involves improvements in the wastewater treating system described above, also teaches that this type of system must be operated at a DO concentration of at least 1 ppm in the oxidation zone. Nowhere in any of these references is it indicated that this type of system can function effectively at substantially lower D.O. levels.

Systems of the type disclosed in FIG. 1 of U.S. Pat. No. 4,056,465 having an initial sorption zone followed by an oxidation zone are sometimes denominated "A/O" ®systems. Systems of the type illustrated in FIG. 2 of said patent, having an anoxic zone intermediate the sorption and oxidation zones are referred to as "A/A/O" or "A$^2$/O" TM systems.

BRIEF SUMMARY OF THE INVENTION

It has now been found that substantial savings in power consumption and oxygen usage can be attained in a method for operating an activated sludge system to produce a non-bulking sludge having rapid settling characteristics and containing an activated biomass species capable of removing phosphate values. The basic process comprises: (a) forming a mixed liquor in a BOD sorption zone, said mixed liquor being formed by mixing an activated biomass with a soluble BOD$_5$ containing wastewater influent, under conditions such that at least 25% of the soluble BOD$_5$ is sorbed by said biomass; (b) subsequently oxidizing the BOD$_5$ in the mixed liquor, including at least part of the BOD$_5$ sorbed in said biomass, in an oxidation zone by contacting the mixed liquor with an oxidizing agent, said oxidizing being effective for oxidizing at least 30% of the total influent BOD$_5$; (c) settling the resulting oxidized mixed liquor in a settling zone thereby forming a supernatant liquor and a dense sludge containing activated biomass; and (d) recycling at least a portion of the dense sludge to the BOD sorption zone. The savings in power consumption and oxygen usage are attained by incorporating oxidizing agent into said oxidation zone at a rate which does not substantially exceed the rate of oxidation of the $BOD_5$.

Operating this type of system as described above results in effective BOD removal, while obtaining dense sludge of good settling characteristics and desired high to adequate removal of phosphate from the wastewater influent.

BRIEF DESCRIPTION OF THE DRAWINGS

The single FIGURE of the accompanying drawing is a schematic and diagrammatic side view of a simplified system for practice of the invention.

DETAILED DESCRIPTION OF THE INVENTION

Referring to the accompanying drawing, a modified activated sludge treating facility is represented, in many respects similar to that depicted in FIG. 1 of U.S. Pat. No. 4,056,465. The wastewater to be treated, generally, but not necessarily, is clarified wastewater from a primary sedimentation tank or clarifier (not shown), initially enters the BOD sorption zone A through the inlet 11. In the sorption zone A the influent wastewater is admixed with recycled sludge settled in sedimentation tank or secondary clarifier 12 and recycled to zone A by line 13. "Anaerobic" conditions; i.e., the substantial absence of oxygen or oxidizing agents, as described above, must be maintained in this zone in order to ensure the proliferation of the desired biomass. A minor portion of the settled sludge is removed by line 14. The purified supernatant liquid is sent via line 15 to receiving streams or reservoirs with or without further treatment as need be.

As shown, zone A is preferably partitioned to provide two or more liquid treating sections in order to afford plug flow of the liquid through the BOD sorption zone A. It has been found that by provision of physically partitioned sections, or the hydraulic equivalent thereof, there is better assurance of achieving the desired freedom from filamentous growth and thereby attaining good sludge characteristics even under adverse conditions. Such adverse conditions, for example, include operation with low concentrations of BOD wherein high surface area biomass would have an advantage in competing for sorption of BOD at low concentration. In the particular embodiment illustrated, zone A is shown as partitioned into two sections or chambers 16 and 17, each equipped with stirring means 19. The liquid passes in approximate plug flow through the several sections of zone A and is discharged into BOD oxidation zone B.

While zone A is shown as having two partitioned sections 16 and 17, it will be understood that a single section or three or more such sections may be employed. Zones A and B may be separate interconnected vessels provided with suitable means for effecting substantial uni-directional flow of liquid from zone A to zone B with minimal back mixing.

Zone A is herein designated a BOD sorption zone of a wastewater treatment plant. The term "BOD sorption zone" with respect to the described system of the present invention has reference to and is defined as that zone of a wastewater treatment plant in which the influent wastewater and recycled sludge are initially mixed and in which at least 25%, and preferably at least 50%, of the soluble $BOD_5$ content of the influent wastewater is sorbed or transferred from the aqueous phase of the mixed liquor to the solid sludge.

The term "soluble $BOD_5$" refers to biological oxygen demand which passes through a 1.25 micron glass-fiber filter, exclusive of oxygen needed for oxidation of nitrogen values.

The principal oxidation of BOD present in the influent wastewater takes place in oxidation zone B. The term "oxidation zone" as employed with reference to the present system is defined as that zone of a wastewater treatment plant in which means for oxygen mass transfer are employed and the mixed liquor from the BOD sorption zone is contacted with oxygen and/or oxidizing agents under conditions and for a time sufficient to oxidize at least 30 percent of the total BOD that was present in the initial wastewater influent.

Aeration of the liquid is effected in zone B in a known manner; thus, as shown, compressed air may be admitted into the bottom of the oxidation zone by spargers 20. If desired, instead of or in addition to spargers, the oxygenated zone may be provided with mechanical aerators. Also, instead of air, oxygen of any desired purity may be admitted to zone B, in which event suitable means for covering all or part of the zone may be required.

As illustrated in the drawing, zone B is partitioned into two liquid treating sections 26 and 27, although, as will be understood, a single section or a greater number of such sections may be employed if so desired. One of the reasons for staging in zone B is because phosphate uptake is observed to be of first order relation with respect to soluble phosphate concentration; thus the low value of phosphate in the effluent is best obtained with plug flow configuration.

While the biological stress which results in the selection of a preferred biomass occurs in the BOD sorption zone (A), the function of the BOD oxidation zone (B) is to generate energy by oxidation of BOD. This energy is used for growth of biomass and transfer of phosphate values from the bulk liquor to the interior of the biomass. Removal of phosphate stored in the biomass as polyphosphates is estimated to require from about 1% to 5% of the energy generated by oxidation of the BOD.

The rate of oxygen uptake; oxidation; in this zone can be calculated by shutting the system down after a period of operation and measuring the change in the DO level over a given period of time. The change in DO is correlated to the weight of the Volatile Suspended Solids (VSS) to give the oxygen uptake rate in terms of mg $O_2$ per gm VSS. The DO level is measured using a membrane-type DO probe which is commonly known in the art. Alternatively, instead of shutting the system down, a slip stream can be taken from zone (B) and the oxygen uptake rate calculated externally. This allows for continuous or periodic measurements to be made without shutting the system down. If this method is used, care must be taken to insure that the slip stream is a representative sample of the contents of zone (B). Accordingly, zone (B) can be agitated to create an approximate homogeneous mixture, or the slip stream can be a mixture taken from various areas of zone (B).

It has been observed that the rates of oxygen uptake are relatively slow in the BOD oxidation zone of the present process as compared to conventional activated sludge systems. For instance, an oxygen uptake rate of 30 mg of oxygen per gram of Volatile Suspended Solids (VSS) per hour at 20° C. is rarely exceeded in the practice of the present invention, whereas in conventional aeration, the oxygen uptake rate can be over twice as great, as described, for example, in U.S. Pat. No. 3,864,246. This indicates that the BOD sorbed in the sorption zone is stored in a form which is only slowly available for oxidation. The result is that the initial oxygen uptake rate is slow and further decreases slowly with time.

Sufficient oxidation must occur in this zone to oxidize at least 30% of the total $BOD_5$ fed to the system. Unoxidized $BOD_5$, of course, is wasted with the sludge. If $BOD_5$ is not oxidized to a sufficient extent, the sorption of fresh $BOD_5$ upon recycle of the clarifier underflow to the initial sorption zone is inhibited. This has an adverse effect in that, upon repeated cycles, progressively lesser amounts of influent $BOD_5$ are sorbed in the initial zone and progressively larger amounts of unsorbed $BOD_5$ are transferred to the oxidation zone where it is sorbed and metabolized by conventional microorganisms. Under such conditions the polyphosphate accumulating microorganisms eventually wash out.

Therefore, to maintain the desired characteristics of the system; e.g., a desirable non-filamentous biomass species producing sludge having excellent settling properties, conditions must be controlled such that at least about 30%, and preferably at least about 40%, of the total $BOD_5$ is oxidized in the system.

An important consequence of the biological selection which occurs in the BOD sorption zone is that there is no longer a requirement for a minimal dissolved oxygen concentration (DO) to be maintained in the oxidation zone in order to effect the required minimum 30% oxidation. This is in contrast to the prior art which teaches that a DO level of at least about 1 ppm, and preferably a much higher DO level is required to effect the necessary 30% $BOD_5$ oxidation. This is due to the fact that, under the conditions described above, the selected organisms store the $BOD_5$ in a form which is only slowly available for oxidation, thereby eliminating the need for an excess of oxidizing agent to be present to keep up with the rate of oxidation. The $O_2$ consumption of this type of system is a function of the F/M of the system and not of the DO level; where F is the weight of the total $BOD_5$ introduced by the influent wastewater per day and M is the weight of the biomass measured as mixed liquor volatile suspended solids (MLVSS) in the system; i.e., in the BOD sorption zone, the BOD oxidation zone and the anoxic zone, if present, but not in the primary and/or secondary clarifier. In fact, all that is required to attain the necessary amount of oxidation is that the oxidizing agent be incorporated into the oxidation zone at a rate substantially equal to the rate of oxidation.

If the oxidizing agent is added at a rate not substantially exceeding the rate of oxidation, large savings in power and oxygen consumption can be attained. It was found that adding oxidizing agent at a rate not exceeding the measured rate of oxidation by about 0.5%, and preferably not exceeding the oxidation rate by about 0.4%, provides for a much more efficient system than the prior art systems which require the presence of a DO level of at least 1 ppm. Adding oxidizing agents at this rate results in a low DO level in the oxidation zone. Therefore, it is possible to run this system by monitoring the DO level in the oxidation zone, as well as by measuring the oxygen uptake rate. If the system is run by monitoring the DO level, a DO level of about 0.6 ppm should not be exceeded in order to insure that the oxidizing agent is not being added at a rate exceeding the oxidation uptake rate by more than about 0.5%, and preferably a DO level of about 0.4 ppm should not be exceeded to insure that the oxidizing agent is not being added at a rate exceeding the oxidation rate by more than about 0.4%.

While the present system can run efficiently when the oxidizing agent is being added into the oxidation zone at a rate equal to the rate of oxygen consumption; resulting in a DO level of 0 ppm; if the oxidizing agent falls below this rate the system would no longer be operating efficiently and the selected biomass would eventually wash out. To prevent this type of wash out, it is preferred that the present system be operated by adding oxidizing agent into the oxidation zone at a rate exceeding the measured oxygen uptake rate by at least about 0.1%, or, if the system is being run by monitoring the DO level in oxidation zone, that a DO level of at least about 0.1 ppm be maintained.

Running the system under these conditions in the oxidation zone, it has been found unexpectedly, does not result in any observable difference in $O_2$ consumption as compared with systems operating at a high DO level. This is contrast to prior art teachings (as found, for example, in U.S. Pat. No. 3,864,246 and 4,162,153) wherein minimum DO levels of at least 1 ppm and generally more than 2 ppm are required.

The ability to run this type of system under the conditions set out above allows for substantial power savings.

The actual Kilowatts (kw) drawn per hour $=0.8 \times hp$, where hp is horsepower.

From the above figures the yearly power requirement to run this type of system is calculated to be $0.8 \times hp/hr$ (24 hr/day) (365 day/yr)$=7008 \times hp/yr$.

A 10 million gallon/day treatment plant using air for aerating the oxic zone utilizes about 275 hp/hr when oxidizing agent is added at a rate of about 0.5% above the oxygen uptake rate, and 340 hp/hr when operating at a DO level of 2 ppm, as described in the prior art.

From the above figures, a total of about 455,520 kw per year will be saved by running the above described plant in accordance with the present invention as compared to the prior art teachings.

Thus, it is calculated that a savings of about 19% in power requirements could be realized by adding oxidizing agent at a rate not substantially exceeding the oxygen uptake rate by 0.5% in the oxidation zone (B) for example, as compared to operating at a DO level of 2 ppm, and a saving of 23% as compared to operating at a DO level of 10 ppm. This calculation is based on the use of relatively pure oxygen in the system as determined by the solubility of oxygen in water at atmospheric pressure.

It has been observed that when operating high rate systems, less oxygen is utilized than that of conventional activated sludge systems. A high rate system is defined as one having an overall F/M ratio greater than or equal to about 0.3. Therefore, even at these high throughput rates, the present system continues to remove BOD and substantial quantities of phosphates while maintaining a desirable non-filamentous biomass species and while also operating the system at low DO levels.

The present invention can be applied to systems including an anoxic zone positioned either between the BOD sorption zone (A) and the oxidation zone (B), or after the oxidation zone (B), to effect reduction of $NO_x^-$ therein. For the purpose of calculating the extent of $BOD_5$ oxidation in this invention, oxidation of $BOD_5$ effected in the anoxic zone, shall be counted as though it occurred in the oxidation zone.

EXAMPLE 1

A pilot plant having a BOD sorption zone, A, consisting of three 58 gallon stages and a BOD oxidation zone, B, consisting of four 147 gallon stages, was initially seeded with 7.5 gallons of liquor containing about 1% of a phosphate-removing sludge, obtained from steady state operation of a laboratory A/O unit. It was operated for approximately two weeks, run 1, at a high DO level in the oxidation zone, i.e. average DO of 10 ppm. At another time it was operated in accordance with the conditions of the present invention, run 2. Instead of monitoring the rate of oxygen uptake, and adding the corresponding amount of oxidizing agent, the DO level in the oxidation zone was regulated to be between 0.2 and 0.3 ppm, thereby ensuring that the system was operating within the range of the present invention.

The system showed good phosphate and $BOD_5$ removal at both the high and low DO operating levels. The higher overall F/M and $BOD_5/P$ ratios during run 1 are responsible for the slightly better phosphate removal during this run as compared to run 2.

The data recorded in operation of Example 1 is reported in Table 1.

TABLE 1

|  | RUN 1 | RUN 2 |
|---|---|---|
| Influent Detention time (hrs.) | 2.10 | 1.59 |
| T, °C. | 24 | 22.5 |
| Avg. MLVSS, ppm | 2600 | 2683 |
| Avg. DO, ppm |  |  |
| A zone | 0.2 | 0.2 |
| B zone | 10 | 0.27 |
| F/M |  |  |
| overall | 0.74 | 0.63 |
| A zone | 3.26 | 2.77 |
| $BOD_s/P_s$ | 14 | 11.2 |
| $BOD_s$, ppm |  |  |
| Infl. | 76 | 55 |
| Effl. | 2.5 | 2 |
| % sorbed in A | 31 | 57 |
| TSS, ppm |  |  |
| Infl. | 124 | 104 |
| Effl. | 22 | 21 |
| $BOD_T$, ppm |  |  |
| Infl. | 153 | 112 |
| Effl. | 9.2 | 9.5 |
| $P_s$, ppm |  |  |
| Infl. | 5.8 | 4.9 |
| Effl. | 1.0 | 1.9 |
| Net removed | 4.8 | 3.0 |
| SVI | 19 | 23 |

MLVSS = Mixed liquor volatile suspended solids
$BOD_T$ = Total $BOD_5$
$BOD_s$ = Soluble $BOD_5$
$P_s$ = Soluble phosphate expressed as elemental phosphorus, P.
TSS = Total suspended solids It is apparent from Example 1 that phosphate removal in a system according to the invention is not significantly affected by whether a high or low DO concentration is maintained in the oxidation zone. Therefore, satisfactory performance of an A/O system can be had and substantial power can be saved during a period of stable operation when the oxidizing agent is incorporated into the oxidation zone at a rate not substantially exceeding the rate of oxidation.

From the above Table 1 it is apparent that an A/O system can perform satisfactorily when operating, contrary to the prior art teachings, with a low DO level in the oxidation zone. In this example the BOD removal rate was well above the required 30% necessary to allow for the proliferation of the desired biomass while operating at a DO level of about 0.27 ppm. In such an operation, considerable savings can be had in the power requirements for oxygen transfer from the air to the liquid (at the same oxygen consumption).

The calculated savings that can be achieved by the present invention as compared to an operation at a DO level of 3 ppm, for example, will be appreciated from the tabulation below, calculated on the basis of using air and assuming that the oxygen saturation level in the liquid is at a concentration of 8 ppm.

| D.O. in BOD Oxidation Zone, ppm | 0.3 | 1.0 | 2.0 | 3.0 |
|---|---|---|---|---|
| Power saving, % | 65 | 29 | 17 | 0 |

It should be noted that less than 1% of the total influent $BOD_5$ was oxidized in the sorption zone.

EXAMPLE 2

A second pilot plant similar to that described in Example 1 is operated at a high DO level, i.e. at least 1 ppm, in the oxidation zone (B), for a period of time sufficient to reach approximate steady state operation. The Plant is then shut down and the rate of oxidation in the oxidation zone (B) is calculated by measuring the change in the DO level over a given period of time. The change in DO level is corrolated to the measured weight of volatile suspended solids (VSS) in zone (B) to give the oxygen uptake rate in terms of mg $O_2$ per gm VSS. The system is then started up and oxidizing agents are added to zone (B) at a rate not exceeding the measured rate of oxidation by about 0.4%.

Operating the system in this manner results in a DO concentration in zone (B) of less than about 0.4 ppm. BOD and phosphates are satisfactorily removed while savings in oxygen consumption and power requirements are realized, and the proliferation of the desired nonfilamentous biomass is accomplished.

Having thus described the present invention, what is now deemed appropriate for Letters Patent is set out in the following appended claims.

What is claimed is:

1. In a method for operating an activated sludge system to produce a non-bulking sludge having rapid settling characteristics and containing an activated biomass species capable of removing phosphate values which comprises:
    (a) forming a mixed liquor in a BOD sorption zone, said mixed liquor being formed by mixing an activated biomass with a soluble $BOD_5$ containing wastewater influent under conditions such that at least 25% of the soluble $BOD_5$ is sorbed by said biomass;
    (b) oxidizing the $BOD_5$ in the mixed liquor, including at least part of the $BOD_5$ sorbed in said biomass, in an oxidation zone by contacting the mixed liquor with an oxidizing agent, said oxidizing being effective for oxidizing at least 30% of the total influent $BOD_5$ in the mixed liquor;
    (c) settling the resulting oxidized mixed liquor in a settling zone thereby forming a supernatent liquor and a dense sludge containing activated biomass; and (d) recycling at least a portion of the dense sludge to the BOD sorption zone;

the improvement which comprises: incorporating oxidizing agent into said oxidation zone at a rate not substantially exceeding the rate of oxidation.

2. The method as defined in claim 1 wherein the oxidizing agent is incorporated into the oxidation zone to effect a DO concentration in the oxidation zone of about 0.1 ppm to 0.4 ppm.

3. The method as defined in claim 1 wherein at least 50% of the soluble $BOD_5$ of said influent wastewater is sorbed by said biomass in said sorption zone.

4. The method as defined in claim 1 wherein said BOD sorption zone comprises a series of at least two hydraulically distinct consecutive stages.

5. The method as defined in claim 1 wherein said oxidation zone comprises a series of at least two hydraulically distinct consecutive stages.

6. The method as defined in claim 1 wherein said wastewater influent contains phosphate values and wherein a major portion of said phosphate is removed from solution in the oxidation zone liquor and stored as polyphosphate in the biomass.

7. The method as defined in claim 1 wherein the rate of introduction of the wastewater influent is so related to the total biomass in said sorption zone and said oxidation zone to provide an overall F/M in the system in excess of 0.3.

8. The method as defined in claim 1 wherein said system comprises an anoxic zone intermediate said BOD sorption zone and said oxidation zone and wherein the rate of introduction of the wastewater influent is so related to the total biomass contained in said BOD sorption zone, said anoxic zone and said oxidation zone, to provide an overall F/M ratio in the system in excess of 0.3.

9. The method as defined in claim 1 wherein said system comprises an anoxic zone after the BOD oxidation zone and wherein the rate of introduction of the wastewater influent is so related to the total biomass contained in said BOD sorption zone, said oxidation zone and said anoxic zone, to provide an overall F/M ratio in the system in excess of 0.3.

* * * * *